M. McCARTY.
Current-Wheels.

No. 155,035. Patented Sept. 15, 1874.

WITNESSES:
E. Wolff
A. F. Terry

INVENTOR:
M. McCarty
BY
Munn & Co
ATTORNEYS.

UNITED STATES PATENT OFFICE.

MICHAEL McCARTY, OF PUEBLO, COLORADO TERRITORY.

IMPROVEMENT IN CURRENT-WHEELS.

Specification forming part of Letters Patent No. 155,035, dated September 15, 1874; application filed August 15, 1874.

*To all whom it may concern:*

Be it known that I, MICHAEL MCCARTY, of Pueblo, Pueblo county, Colorado Territory, have invented a new and Improved Current-Wheel, of which the following is a specification:

My invention consists of a current-wheel arranged at the outside of a float which is arranged in a slip or basin in the river-bank, or between two piers at right angles to the current, so that it can be floated out to extend the wheel into the current, and back to withdraw it therefrom, for stopping and starting the wheel, and regulating it to the force of the current; and the shaft of the wheel is made to slide forward and backward through the wheel for transmitting the power, the wheel being confined in the place for gearing with the counter-shaft to be driven by it.

Figure 1:
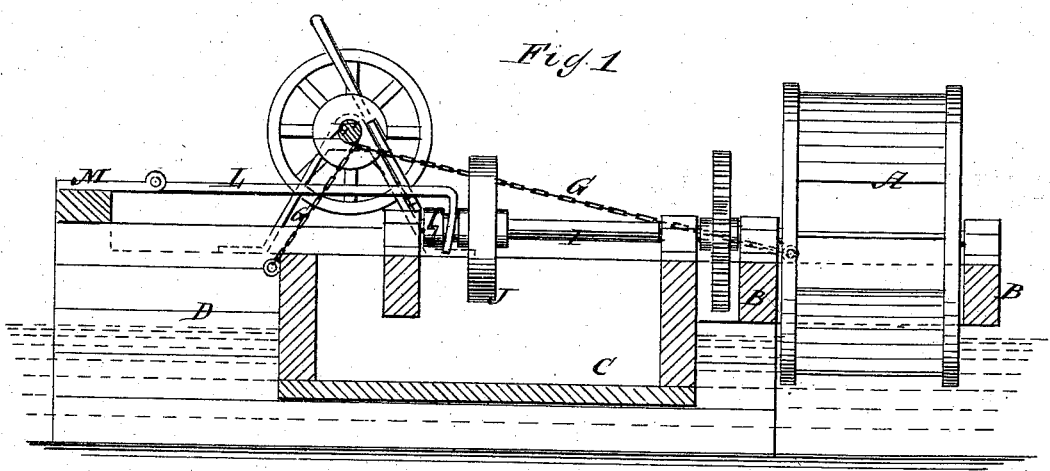
Figure 2:
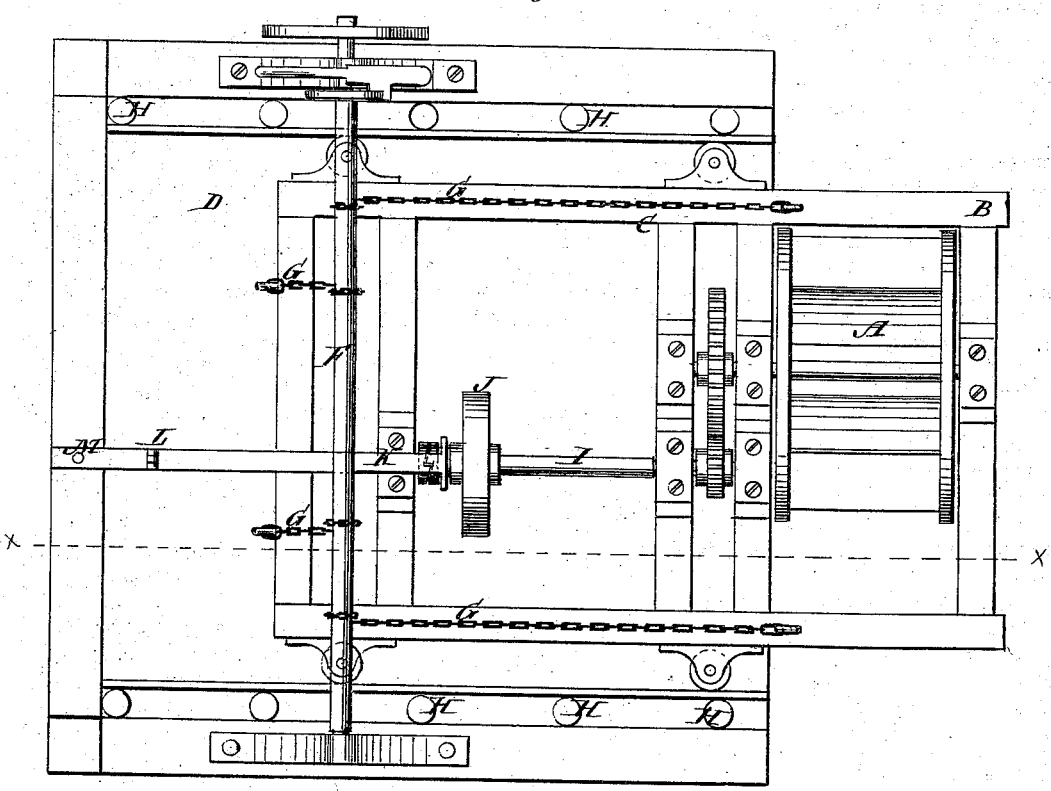

Figure 1 is a longitudinal sectional elevation of a current-wheel arranged according to my invention, taken on the line $xx$, Fig. 2; and Fig. 2 is a plan view.

Similar letters of reference indicate corresponding parts.

A represents the wheel, which is mounted in the frame B, which projects from the float C, so as to overhang said float. The float is arranged in a slip, D, made in the bank, or between projecting piers at right angles to the current of the stream, so as to move the wheel out into the current at the mouth of the slip, or back within the protection of the slip, the slip being deep enough for the float to ride on the water. F represents a windlass, with chains G, for moving the float out and in; and H represents rollers or wheels at the sides of the float, bearing against the walls of the slip to lessen the friction between the float and the walls of the slip. The walls of the slip are to guide the float, the slip being only wide enough to allow it to move freely, but not so as to allow any unnecessary play. The shaft I for transmitting the motion is arranged to slide forward and backward through the driving-wheel J, which is held in its place by the bar K, which is jointed at L to rise and fall with the float, while the end M is held by a fixed object to which it is made fast.

This construction enables the wheel to be easily managed for setting it in motion and stopping it, and also for protecting it from floating objects or too great force of water in time of floods.

Having thus described my invention, I claim as new and desire to secure by Letters Patent—

A current-wheel mounted on a float arranged in a slip at right angles to the current, and provided with means to shift it out into the current and back into the slip, substantially in the manner described.

MICHAEL McCARTY.

Witnesses:
JOHN D. MILLER,
WM. J. BUCKLAND.